United States Patent [19]
Williams

[11] 3,913,989
[45] Oct. 21, 1975

[54] AIR BEARINGS

[75] Inventor: Raymond Williams, Appleton, England

[73] Assignee: United Kingdom Atomic Energy Authority, London, England

[22] Filed: Jan. 22, 1973

[21] Appl. No.: 325,255

[30] Foreign Application Priority Data
Feb. 11, 1972 United Kingdom............ 6449/72
Aug. 31, 1972 United Kingdom.......... 40515/72

[52] U.S. Cl. .............................. 308/9; 308/DIG. 1
[51] Int. Cl. .......................................... F16c 17/16
[58] Field of Search ........................ 308/9, DIG. 1

[56] References Cited
UNITED STATES PATENTS
3,799,630   3/1974   Chisholm .......................... 308/9

Primary Examiner—M. Henson Wood, Jr.
Assistant Examiner—Gene A. Church
Attorney, Agent, or Firm—Larson, Taylor & Hinds

[57] ABSTRACT

The invention concerns gas lubricated bearing assemblies having a sleeve and a shaft one of which is rotatable relative to the other. The sleeve and the shaft are longitudinally located with respect to one another firstly by a hydrostatic gas end thrust bearing formed by a cushion of gas trapped in an enclosed volume at an end of the shaft and secondly by an oppositely acting grooved hydrodynamic thrust gas bearing defined between a radially extending face on the shaft and a co-operating radially extending face on the sleeve. Pressurised gas is fed from the inner to the outer ends of the radially extending faces to enter the trapped volume from where it is vented to atmosphere.

8 Claims, 6 Drawing Figures

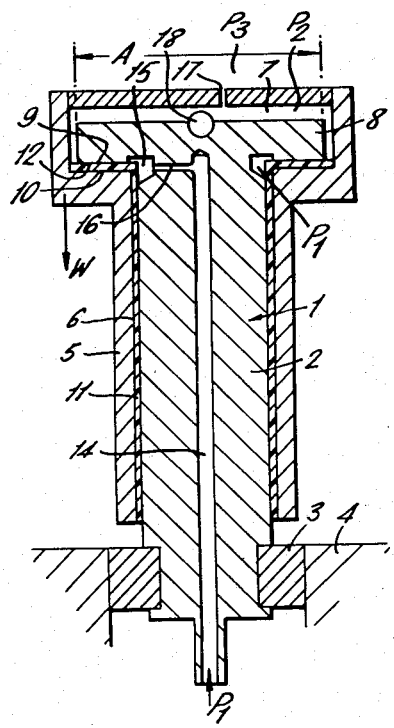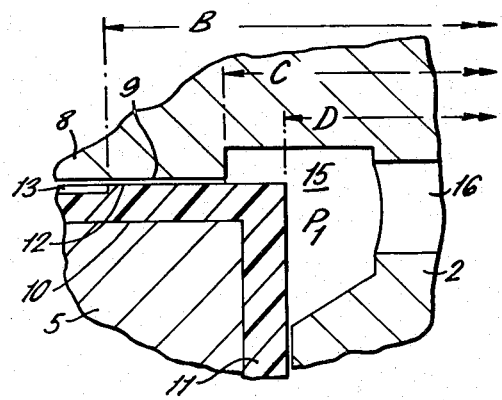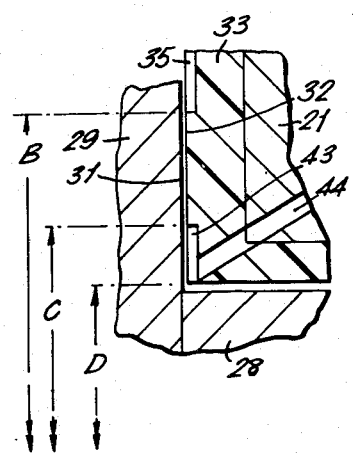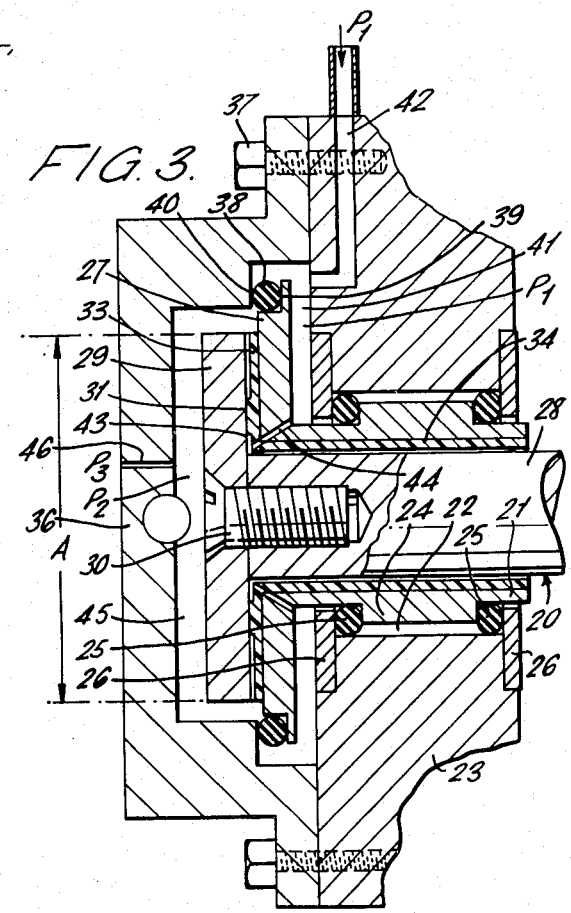

AIR BEARINGS

This invention relates to gas lubricated bearing assemblies and in particular to such assemblies comprising a sleeve and a shaft one of which is rotatable relative to the other. The surface of the shaft and the internal bore of the sleeve are finished to a high standard of accuracy and smoothness in order to substain self acting gas lubrication between the surfaces during rotation.

A known hydrodynamic gas bearing assembly comprises a shaft located in a bearing sleeve having a blind ended bore, said shaft and sleeve being rotatable with respect to one another and being radially located with respect to one another by a hydrodynamic gas journal bearing and longitudinally located with respect to one another firstly by a hydrostatic gas end thrust bearing formed by a cushion of gas maintained in the trapped volume between the blind end of the bore of the bearing sleeve and the end of the shaft and secondly by an oppositely acting grooved hydrodynamic thrust gas bearing defined between co-operating radially extending faces on the shaft and the bearing sleeve. In the known arrangement pressurised gas is fed directly to the trapped volume at the blind end of the bore in the bearing sleeve through a restricted inlet orifice. According to the present invention there is provided a gas lubricated bearing assembly having a sleeve and a shaft the one rotatable relative to the other and having complementary surfaces capable of substaining self-acting gas lubrication therebetween upon rotation, said sleeve and shaft being longitudinally located with respect to one another firstly by a hydrostatic gas end thrust bearing formed by a cushion of gas maintained in a trapped volume at an end of the shaft and secondly by an oppositely acting grooved hydrodynamic thrust gas bearing defined between a radially extending face on the shaft and a co-operating radially extending face associated with the sleeve, means for supplying pressurised gas to the inner end of the co-operating radially extending faces of the hydrodynamic thrust gas bearing, the gas supplied passing radially outwards between the faces of the hydrodynamic thrust gas bearing to feed into the trapped volume and a restricted outlet orifice being provided for venting of gas from the trapped volume.

The incoming pressurised gas supply can be isolated from the trapped volume by means of a flexible O-ring arranged about the periphery of the radially extending face on the bearing sleeve and bearing against a wall of a chamber defining the trapped volume. Experience has shown that the O-ring tends to resist swash of the radially extending faces. In a modified form of the present invention the radially extending face of the sleeve and the sleeve itself are formed as two separate components and the incoming pressurised gas is prevented from entering directly into the said trapped volume by the provision of an O-ring between the radially extending face and the sleeve which is located adjacent the shaft.

Embodiments of the invention will now be described by way of example with reference to the accompanying drawings in which:

FIG. 1 is a longitudinal sectional elevation of one embodiment in accordance with the invention, FIG. 2 is a detail of FIG. 1 on a larger scale, FIG. 3 is a longitudinal sectional elevation of a second embodiment in accordance with the invention, FIG. 4 is a detail of FIG. 3 on a larger scale.

Figure 5:
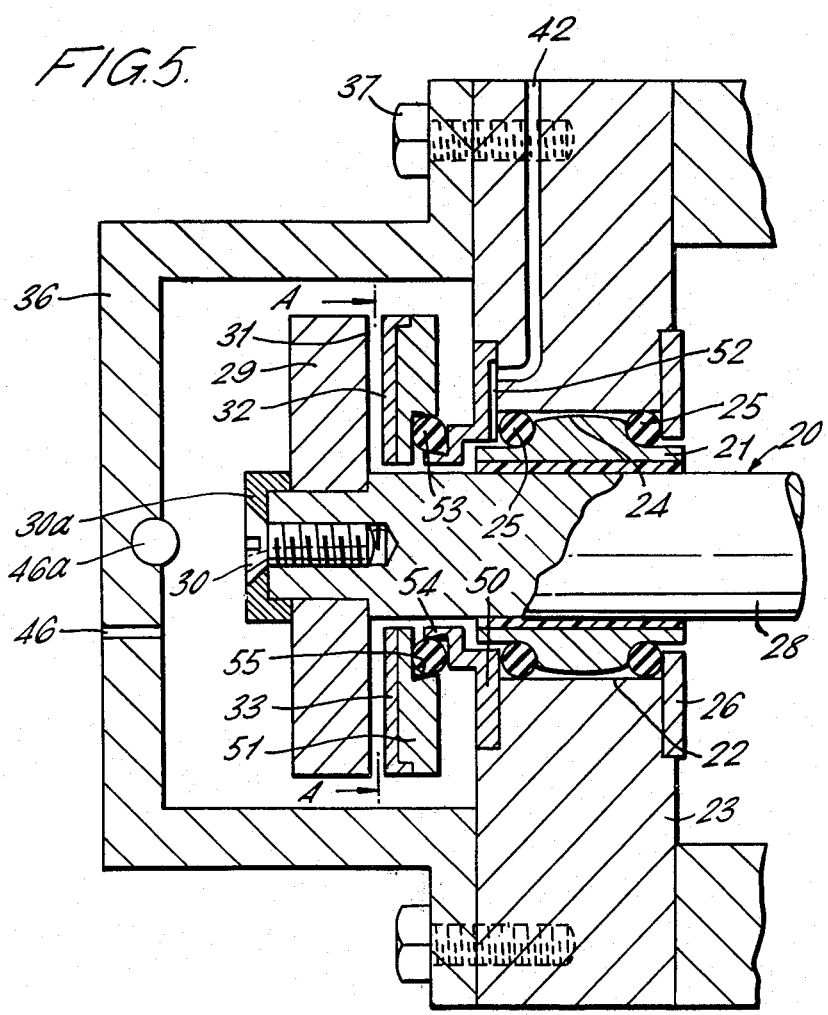
FIG. 5 is a longitudinal sectional elevation of a third embodiment.

Referring to FIG. 1 of the drawings a bearing assembly 1 is shown in which a hardened steel shaft 2 is supported by a flexible mounting 3 in a structural member 4. The shaft 2 is surrounded by a close fitting bearing sleeve 5 rotatable on the shaft 2. The bearing sleeve 5 has a blind ended bore 6 which provides an enclosed volume 7 between the blind end of the bearing sleeve 5 and the end of the shaft 2. The enclosed volume 7 is of greater diameter than the bore 6 in order to accommodate an integral flange 8 on the end of the shaft 2. The flange 8 has a lower precision ground annular bearing surface 9 which is opposed by the face of an internal step 10 in the bore 6 of the bearing sleeve 5. The shaft 2 has a precision ground outer surface and the bore 6 of the bearing sleeve 5 has a plastic lining 11 formed with a surface of gas lubrication quality complementary to the surface of the shaft 2. The face of the internal step 10 in the bore 6 of the bearing sleeve 5 has an annular bearing surface 12 of gas bearing quality formed by a plastic coating on the face of the step 10. The bearing surface in the plastic lining 11 of the bearing sleeve 5 and the surface 12 on the face of the step 10 in the bore 6 of the bearing sleeve 5 may be formed for example by the method disclosed in our British Pat. No. 979731. Spiral pumping grooves 13 (FIG. 2) extend part way from the outer edge of the bearing surface 12 towards its centre. Alternatively the annular bearing surface 9 of the flange 8 may be grooved. The shaft 2 is provided with a longitudinal internal air duct 14. The annular bearing surface 9 on the end flange 8 of the shaft 2 is circumferentially recessed at its inner end and the shaft 2 is grooved at its junction with the end flange 8 to define a trapped volume 15 between the end flange 8 and the bearing sleeves. A radial passageway 16 connects the internal air duct 14 in the shaft 2 with the trapped volume 15. An orifice 17 of restricted diameter in the blind end of the bearing sleeve 5 provides for venting of gas from the enclosed volume 7.

Referring to FIG. 3 of the drawings a bearing assembly 20 is shown in which a bearing sleeve 21 is flexibly supported within a housing 22 in a casing 23. The bearing sleeve 21 has circumferential flange 24 which fits with clearance in the housing 22. Rubber O-rings 25 fitted on the bearing sleeve 21 on either side of the flange 24 support the bearing sleeve 21 flexibly in the housing 22. Annular retaining plates 26 for the O-rings 25 are fitted in the casing 23 at either end of the housing 22. The bearing sleeve 21 has an end flange 27.

A hardened steel shaft 28 is fitted inside the bearing sleeve 21. A circular end flange 29 is attached to the end of the shaft 28 by a bolt 30.

The end flange 29 has a precision ground annular bearing surface 31 which is complementary to a bearing surface 32 of gas lubrication quality formed on a plastic coating 33 on the end flange 27 of the bearing sleeve 21. The shaft 28 has a precision ground outer bearing surface and the bore of the bearing sleeve 21 has a plastic lining 34 which is formed with a bearing surface of gas lubrication quality complementary to the surface of the shaft 28. The bearing surface of the plastic lining 34 in the bearing sleeve 21 and the bearing surface on the plastic coating 32 on the end flange 27 of the bearing sleeve 21 may be formed by the method disclosed in our British Pat. No. 979731. Spiral pumping grooves 35 (FIG. 4) extend part way from the outer edge of the bearing surface 32 on the end flange 27 of the bearing sleeve 21 towards the centre of the bearing surface 32. A dished cover plate 36 enclosing the end flange 29 on the shaft 28 and the end flange 27 of the bearing sleeve 21 is attached by bolts 37 to the casing 23. A rubber O-RING 38 is fitted in an annular groove 39 around the outer edge of the end flange 27 on the bearing sleeve 21. The rubber O-ring 38 seals against an annular face 40 in the cover plate 36. A closed annular space 41 is thus defined between the end face of the casing 23 and the end flange 27 of the bearing sleeve 21. An air inlet passageway 42 in the casing 23 connects with the closed annular space 41. The bearing surface 32 on the end flange 27 of the bearing sleeve 21 is recessed around its inner edge to define a closed volume 43 between the inner edge of bearing surface 32 and the inner edge of the annular bearing surface 31 on the end flange 29 of the shaft 28. A drilling 44 in the bearing sleeve 21 at its junction with the end flange 27 connects the closed annular space 41 which is defined between the end face of the casing 23 and the end flange 27 of the bearing sleeve 21 with the closed volume 43 which is defined between the inner edges of the bearing surfaces 31 and 32 on the flanges 29 and 27. A closed volume 45 is defined between the cover plate 36 and the end flange 29 of the shaft 28. An orifice 46 of restricted diameter in the face of the cover plate 36 provides for venting of gas from the closed volume 45.

In operation of the bearing assembly of FIG. 1 with the bearing assembly in the orientation as shown and when the bearing assembly is at rest, the weight W of the bearing sleeve 5 causes the bearing sleeve 5 to drop on the shaft 2 so that the annular bearing surface 12 of the bearing sleeve 5 separates from the annular bearing surface 9 of the shaft 2 and the weight of the bearing sleeve 5 is supported on a central ball 18 at the top of the shaft 2. The air duct 14 now has access to the whole of the enclosed volume 7 at the upper end of the bearing sleeves. When air at pressure $P_1$ is admitted it acts on the projected area defined by dia D (FIG. 2) on the blind end of the bearing sleeves with the result that an upward force of area $D \times (P_1-P_3)$ ($P_3$ being the external atmospheric pressure), exists which is in excess of the dead load W. This lifts the bearing sleeve 5 so that the annular bearing surfaces 9 and 12 come together and being accurately flat and truly parallel, form a tight restriction to air flow over the plain central region of the annular bearing surfaces 9 and 12 defined between the limits of dia C and dia B (FIG. 2). Air in the closed volume 7 above the flange 8 on the shaft 2 now vents to atmosphere ($P_3$) and the pressure in the closed volume 7 reduces to a pressure $P_2$. When area $D \times (P_2-P_3)$ equals the load W, the annular bearing surfaces 9 and 12 begin to separate and air flows from the air duct 14 between the bearing surfaces 9 and 12 into the closed volume 7 thereby maintaining the pressure $P_2$. The system is consequently held in balance with no interface load between the bearing surfaces 9 and 12, although the whole assembly is stationary and no self generated film exists between the bearing faces 9 and 12.

The spiral grooves 13 in the annular bearing surface 12 extend from dia B outward to beyond dia A and are arranged to be "in pumping" when the bearing sleeve 5 rotates on the shaft 2. When rotation starts a self generated air film occurs between the annular bearing surfaces 9 and 12 causing the bearing surfaces 9 and 12 to separate by increasing the mean pressure over the whole interfacial area of the bearing surfaces 9 and 12. This permits a counter flow of air from the air duct 14 into the closed volume 7 because of the increased gap. $P_2$ now increases to balance the dead load W and the self generated separating force which is set up between the annular bearing faces 7 and 12 thereby maintaining close alignment between the bearing surfaces 9 and 12. Should a sudden externally applied force in addition to and in the direction of W act on the bearing sleeve 5 the bearing surfaces 9 and 12 will separate, the faces will separate further and further and more air will flow from the air duct 14 into the closed volume 7, thereby increasing $P_2$ in the limit to the value of $P_1$. This additional pressure counters the additional force by a force defined by area $D \times (P_2-P_3)$ (where the pressure in the closed volume has increased to the value $P_2$) and restores the assembly to the original position. Should a similar force be applied in the opposite direction then the separation between the bearing surfaces 9 and 12 reduces, so that less air flows from the air duct 14 into the closed volume 7 and $P_2$ falls by venting via orifice 17 to atmosphere $P_3$). Therefore the self generated air film plus the dead load W tend to restore the assembly to the original position. By these means the whole assembly is accurately located in space at all times.

If we now consider the whole assembly of FIG. 1 to be inverted such that the dead load W is in the opposite sense to that as shown in FIG. 1 it can be seen that when stationary the bearing sleeve 5 will drop so that its annular bearing surface 12 comes into contact with the annular bearing surface 9 of the shaft 2 and frictional contact exists between the annular bearing surfaces 9 and 12 entirely dependant on the load W. In a simple assembly, application of air through the air duct 14 would not be admitted to the closed volume 7 because of the seal made by the dead load acting across the plain parts of the bearing surfaces 9 and 12 between dia B and dia C. If air does leak across this seal and initiate a pressure $P_2$ in the closed volume 7 then the load defined by area $D \times (P_2-P_3)$ acting on the bearing sleeve 5 is in the same sense as W therefore the interface pressure load between the bearing surfaces 9 and 12 is increased and the contact friction is also increased. The grooving of the shaft 2 to define the trapped volume overcomes this handicap and enables low starting friction between the bearing surfaces 9 and 12 to be achieved irrespective of the attitude of the assembly.

The region over which the inner end of the annular bearing surface 9 on the end flange 8 of the shaft 2 is recessed extends to diameter C (FIG. 2) which is greater than the diameter D of the shaft 2. When air under pressure is admitted into the air duct 14 the air at inlet pressure $P_1$ acts on the exposed annular inner edge of the bearing surface 12 (between diameters C and D) in the bore of the bearing sleeve 5. This applies a longitudinal loading on the bearing sleeve 5 counteracting the deadweight loading W acting on the bearing sleeve 5. The loading is Area $(C \text{ dia} - D \text{ dia}) \times (P_1-P_3)$. With $P_1$ of sufficient magnitude this is in excess of W therefore causing the bearing sleeve 5 to lift on the shaft 2 resulting in separation of the annular bearing surfaces 9 and 12. This allows air to flow from the air duct 14 into the closed volume 7 between the bearing surfaces 9 and 12. The system will come into balance when Area $(C \text{ dia} - D \text{ dia}) \times (P_1-P_3) = W \times \text{Area } D \text{ dia} \times (P_2-P_3)$. Again the whole of the dead load W is supported on the cushion of air generated in the closed volume 7 when the assembly is at rest and little or no friction exists between the bearing faces 9 and 12. When the bearing sleeve 5 rotates on the shaft 2 the self generated film between the annular bearing surfaces 9 and 12 arises and the thrust bearing performs in the manner previously described.

The dia C is optimised to give the maximum stiffness of the air cushion in the closed volume 7 ie the dia chosen for C will affect the ratio of $P_1$ to $P_2$; this ratio should be large to ensure stable running.

The assembly of FIG. 3 operates in exactly the same way as the assembly of FIG. 1 the difference being the way air is introduced into the bearing, via the air inlet passageway 42 in the casing 23. The step relief dia C (FIG. 4) is made in plastic bearing surface 32 of the bearing sleeve 21 for convenience and the cover plate 36 is separate from the bearing sleeve 21 to reduce its inertia, thereby improving its ability to resist whirl instabilities.

As can be seen from FIG. 3 the cover plate 36 defines the closed volume 45 as compared with the arrangement of FIG. 1 in which the closed volume 7 is defined by the blind end of the bearing sleeve 5. Owing to this difference, problems exist for introducing air and separating the closed annular space 41 containing air at $P_1$ and the closed volume 45 containing air at $P_2$. At the same time excessive restraint of the self aligning properties and whirl damping properties of the bearing sleeve 21 must be prevented.

This is effected by mounting of the bearing sleeve 21 in the O ring 25 and by the provision of the O-ring 38 which is fitted in the annular groove 39 around the outer edge of the end flange 27 of the bearing sleeve 21 and sealing against the annular face 40, in the cover plate 36. The cover plate 36 is slightly compresses the O ring 38 in the annular groove 39 so that slight axial "nip" occurs between this O ring 38 and the O ring 25 furthest away from it. These two O rings 38 and 25 seal off the closed annular space 41 into which air at $P_1$ can be admitted through the air inlet passageway 42. The effect of this air pressure is to put an axial load on the bearing sleeve 21 which further compresses the O ring 38 thereby increasing the sealing force. Air from the closed annular space 41 is admitted to the closed volume 43 defined between the inner edges of the annular bearing surfaces 31 by the drilling 44 connecting the closed volume 43 with the annular space 41. The air escapes between the annular bearing surfaces 31 and 32 into the closed volume 45 and raises the pressure therein to $P_2$.

Figure 6:
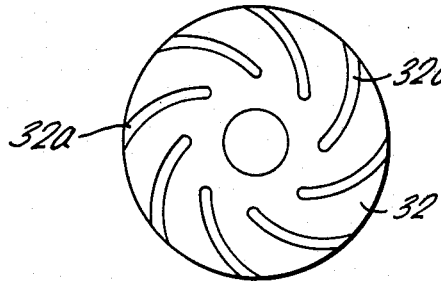
FIG. 6 is a view along the line A—A in FIG. 5.

In FIGS. 5 and 6 a bearing assembly 20 has a bearing sleeve 21 flexibly supported within a bore 22 in a casing 23. The sleeve has a convex centre portion 24 which fits with clearance in the bore 22. Resilient O-rings 25 support the sleeve 21 in the bore 22.

An annular plate 26 fitted to the casing 23, retains the O-ring at the right-hand end of the sleeve as seen in FIG. 1 in position. The O-ring at the left-hand end of the sleeve is retained in position by an annular dish-shaped member 50.

A shaft 28 is fitted within the sleeve 21 and an end plate 29 is attached for rotation to the end of the shaft 28 by a bolt 30 and cap 30a.

The end plate 29 has a precision ground annular bearing face 31 which is complementary to a bearing surface 32 of gas lubrication quality and containing self-acting spiral pumping grooves 32a. The grooves are shown in FIG. 6. The grooves can be formed in a plastics coating 33, provided on a thrust plate 51 carried by an O-ring 53 supported on the dished shaped member 50. The thrust plate 51 has a small clearance between it and the shaft 28 and through which air introduced under pressure through a passageway 42 is admitted to the region between the thrust plate 51 and the end plate 29. Whereas the grooves have been described as being formed in the stationary thrust plate 51 they can be formed in the rotatable end plate 59 and it is not essential that one of the bearing faces be provided with a plastics coating. Indeed the bearing faces can be metal or can be formed from such materials as glass and ceramics.

The shaft 28 has a precision ground outer bearing surface and the bore of the sleeve 21 has a plastics lining which is formed with a bearing surface of gas lubrication quality complementary to the surface of the shaft 28. An end cover plate 36 is attached by bolts 37 to the casing 23. The cover plate 36 is provided with a venting orifice 46. A ball 46a in the end wall of the cover plate 36 serves as an end stop for the bearing assembly.

The air inlet passageway 42 in the casing 23 communicates with a radial groove 52 in the dish shaped member 50. The O-ring 53 is located within a pocket formed between an annular lip 54 on the member 50 and a stepped portion 55 in the thrust plate 51. The lip 54 and the stepped portion 55 are shaped as a dove tail. This configuration ensures that the O-ring 53 is firmly retained axially and gives a good seal between the volume enclosed by the cover plate 36 and the side of the dish shaped member in communication with the passageway 42.

The bearing operates in a manner similar to that described with reference to FIG. 3. However, it is to be noted that the O-ring 53 is now located adjacent the shaft 28, and not, as before, at a position radially remote from the shaft. Further the thrust plate 51 is now independent and separate from the sleeve 21. As a result there is a reduction in the resistance to swash of the thrust plate 51. The stationary thrust plate 51 is more readily self aligning with the rotating plate 29, the stability and movement of the thrust plate 51 and the bearing sleeve 21 are independent of each other and the O-ring provides an efficient seal between the incoming pressurised air and the air trapped within the end cover plate.

In certain cases it is possible to omit the spiral groove 32a in the bearing surface 32. Instead a "pocket" can be arranged at the centre of the statiaonary thrust plate to receive high pressure air admitted through the passageway 42.

What we claim is:

1. A gas lubricated bearing assembly having a sleeve and a shaft the one rotatable relative to the other and having complementary surfaces capable of sustaining self-acting gas lubrication therebetween upon roatation, said sleeve and shaft being longitudinally located with respect to one another firstly by a hydrostatic gas end thrust bearing formed by a cushino of gas maintained in a trapped volume at an cushion of the shaft and secondly by an oppositely acting grooved hydrodynamic thrust gas bearing defined between a radially extending face on the shaft and a co-operating radially extending face associated with the sleeve, means for supplying pressurised gas to the inner end of the co-operating radially extending faces of the hydrodynamic thrust gas bearing, the gas supplied passing radially outwards between the faces of the hydrodynamic thrust gas bearing to feed into the trapped volume and a restricted outlet orifice being provided for venting of gas from the trapped volume.

2. A gas lubricated bearing assesmbly according to claim 1 in which the shaft is fixed and the sleeve is rotatably mounted on the shaft.

3. A gas lubricated bearing assembly according to claim 2 in which pressurised gas is supplied to the inner end of said co-operating radially extending faces by way of a longitudinal duct extending through the shaft and terminating in a radial passageway communicating with an annular recess situated at the inner end of the co-operating faces.

4. A gas lubricated bearing assembly according to claim 1 in which the trapped volume is defined by an end cover member secured to a housing for the shaft and sleeve.

5. A gas lubricated bearing assembly according to claim 4 in which the sleeve is fixed and the shaft is rotatable.

6. A gas lubricated bearing assembly according to claim 5 in which the periphery of the radially extending face on the sleeve which co-operates with the radially extending face on the shaft is in sealing engagement with the interior of the end cover member whereby to isolate the trapped volume about the radially extending face on the shaft from an annular chamber at the opposite side of the radially extending face on the sleeve and in communication with the pressurised gas supply.

7. A gas lubricated bearing assembly according to claim 6 in which the annular chamber communicates with the radially inner ends of the co-operating surfaces through an aperture in the sleeve.

8. A gas lubricated bearing assembly according to claim 4 in which the radially extending face co-operating with the radially extending face on the shaft is provided by an annular thrust plate supported about its internal periphery by a resilient ring.

* * * * *